United States Patent [19]

Salyer et al.

[11] 4,230,551

[45] Oct. 28, 1980

[54] ELECTROSYNTHESIS PROCESS FOR MAKING AMINE/ALDEHYDE POROUS STRUCTURES AND POWDERS

[75] Inventors: Ival O. Salyer, Dayton; Arthur M. Usmani, Centerville, both of Ohio

[73] Assignee: Monsanto Research Corporation, St. Louis, Mo.

[21] Appl. No.: 618,995

[22] Filed: Oct. 2, 1975

[51] Int. Cl.³ .................. C25D 15/00; C25B 3/10
[52] U.S. Cl. .................. 204/181 R; 204/72; 204/73 R; 204/78
[58] Field of Search ........... 204/72, 73 R, 78, 181, 204/181 R, 181 C

[56] References Cited

U.S. PATENT DOCUMENTS

| | | |
|---|---|---|
| 3,449,228 | 6/1969 | Yurcheshen et al. .......... 204/181 |
| 3,846,269 | 11/1974 | Martello et al. .............. 204/181 |
| 3,887,442 | 6/1975 | Gilchrist ..................... 204/72 |
| 3,965,058 | 6/1976 | Yurcheshen et al. .......... 260/21 |

Primary Examiner—F. C. Edmundson
Attorney, Agent, or Firm—L. Bruce Stevens

[57] ABSTRACT

The invention is a process for making porous amine-/aldehyde structures or powders comprising solid approximately-spherical cross-linked particles of less than 10 microns, said process comprising electrolyzing aqueous solutions of urea-formaldehyde prepolymer, melamine-formaldehyde prepolymer or mixtures thereof under electrolysis conditions sufficient to initiate condensation polymerization and formation of said structures or powders. The structures are all broadly designated as open pore urea-formaldehyde structures (OPUF) even though, of course, the ones made from melamine and formaldehyde without urea will have no urea in them. If the reactor is stirred during polymerization powders consisting of primary spherical particles and small porous agglomerates, are formed.

1 Claim, 3 Drawing Figures

ELECTROSYNTHESIS PROCESS FOR MAKING AMINE/ALDEHYDE POROUS STRUCTURES AND POWDERS

BACKGROUND OF THE INVENTION

1. Field of the Invention

The invention relates to processes for producing urea/formaldehyde type resins.

2. Description of the Prior Art

Structures and powders similar to those made by the process of this invention have been made by acid catalysis of amine/aldehyde solutions in the following manner:

At room temperature (unless otherwise desired), a water solution containing the urea-formaldehyde (UF) prepolymer (and any other co-resins to be used) is added to a second water solution containing the acid catalyst and any additives (polymeric plasticizers, etc.) which are employed. This mixtue is agitated by hand just enough to provide thorough mixing, but no more than that. If desired, the mixture may be poured immediately into a mold other than the container in which it was mixed. Once gelation or polymerization has begun, however, the OPUF reaction mixture should be allowed to remain undisturbed. Gelation will generally begin within about one to five minutes after mixing, and in most cases is evidenced by a change from a clear solution to a white, opaque one, followed by rapid hardening of the solution. In general, the OPUF structures which were formed at room temperatures were allowed to remain undisturbed overnight (in a hood to facilitate solvent evaporation), then dried in a vacuum oven at or slightly be lightly below 50° C. Other similar drying method may also be used.

A somewhat different method of preparation was used for all OPUF materials containing a melamine/-formaldehyde resin, as these cure above room temperature. In the case, the resin and catalyst solutions were each warmed to about 40° C. before mixing them together, and then immediately after mixing the "OPUF" mixture was placed in an oven at ~55°-60° C. to promote curing. Drying was simply continued under the same conditions, as it was found that vacuum drying resulted in severe sample shrinkage, probably due to incomplete cure before the vacuum was applied.

The size and shape mold or container employed in casting was determined by the desired end use for the OPUF sample. In general, it was preferable to use polyethylene or polypropylene containers, as their relative porosity assisted in the drying, and there was little or no adhesion to the surface. Special Teflon molds were prepared for casting of cigarette filter rods.

The acid catalyst used for virtually all of this work was concentrated phosphoric acid. Other organic or inorganic acids may be employed in its place, however. Different concentration levels of the phosphoric acid catalyst were employed depending on which of the various resins were used in OPUF formation.

A novelty search of the process of this invention resulted in three patents being reported and these were as follows:

U.S. Pat. No. 2,345,543 describes electrophoresis of colloidal resin solutions of resins such as melamineformaldehyde resin made by acid polymerization but not cured. These colloidal solutions are made by the acid condensation process well known in the art and constitute relatively high molecular weight resin as compared with the low molecular weight prepolymer solutions used in the process of the present invention. Electrophoresis by definition is the migration of suspended particles in an electric field.

U.S. Pat. No. 2,612,483 relates to a delayed-acting hardener for formaldehyde-urea adhesives and coating compositions, and also to the preparation of formaldehyde-urea adhesives and coating compositions having delayed-hardening properties. A prepolymer aqueous solution or dried product is all that is involved here with no electrolysis; furthermore, the prepolymer is made by a different process and has a different composition.

U.S. Pat. No. 3,449,228 describes ungelled reaction products of an amine-aldehyde condensation product and a phenol or polyol in the presence of an acid to provide vehicles for water dispersed compositions that are applied by electrodeposition. Preferably, the reaction product is employed in combination with a polycarboxylic acid resin. The reaction products described are acid catalyzed high molecular weight resins and as stated are preferably used in combination with a polycarboxylic acid resin such as an alkyd resin. Also it should be noted that the examples, except Example 3, contain organic coupling solvents to facilitate laying down smooth continuous coatings, and in all the electrodeposition examples an alkyd resin was used together with the aminealdehyde reaction products. Under these conditions the method of the patent would do exactly what it was designed to do—provide a smooth continuous coating on the electrode.

SUMMARY OF THE INVENTION

The invention is a process for making porous amine-/aldehyde structures and powder comprising solid approximately-spherical cross-linked particles of less than 10 microns, said process comprising electrolyzing aqueous solutions of urea-formaldehyde prepolymer, melamine-formaldehyde prepolymer or mixtures thereof under electrolysis conditions sufficient to initiate condensation polymerization and formation of said structures. These structures are all broadly designated as open pore urea-formaldehyde structure (OPUF) even though, of course, the ones made from melamine and formaldehyde without urea will have no urea in them. If the reactor is stirred during polymerization, powders consisting of a mixture of primary spherical particles and small porous agglomerates of the primary particles are formed. If desired, the small agglomerates can be further broken down into primary spherical particles by mechanical grinding.

BRIEF DESCRIPTION OF THE DRAWINGS

The invention will be more clearly understood from the detailed description of specific examples thereof read in conjunction with the accompanying drawing wherein.

DESCRIPTION OF THE PREFERRED EMBODIMENTS

Figure 1:
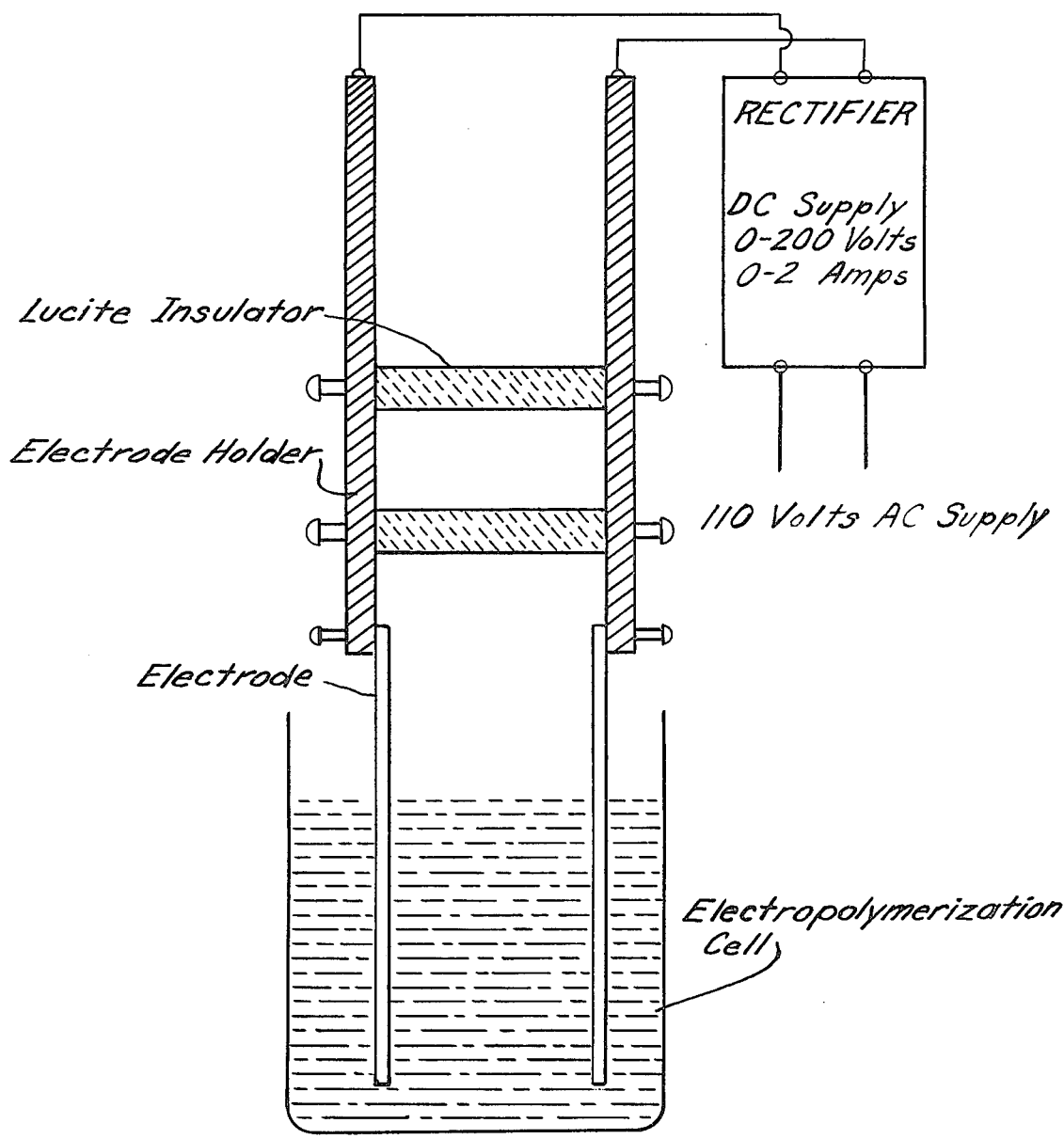
FIG. 1 is a schematic drawing of an electrosynthesis system for making porous structure by the process of the invention.
Figure 2:
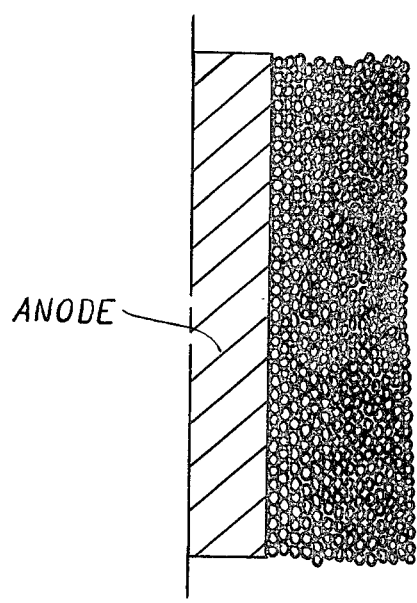
FIG. 2 is a drawing showing in partial section how the porous structure builds around the anode to a thickness of several inches or more.

Urea/formaldehyde prepolymer was prepared in a 22-liter flask fitted with a stirrer, a thermometer, and a reflux condenser. With proper adapters and standard joints, the reflux condenser can be converted into a distillation condenser. A receiver connected to a mechanical pump and the condenser made distillation under vacuum possible, at a satisfactory and desirable rate.

| FORMULA | | |
|---|---|---|
| | Moles | Grams |
| Formalin, 50% solution | 180.0 | 10,790 |
| Urea #1 | 78.3 | 4,690 |
| 5% sodium hydroxide | as needed | |
| 0.5 N sulfuric acid | as needed | |
| Urea #2 | 55.0 | 3,300 |
| Melamine | | 38 |
| Total charge in grams | | 18,818 |

METHOD

Formalin is stored at 50° C. to prevent its polymerization into paraformaldehyde. It has a pH of 2.3. Formalin is charged into the flask and the pH is raised to 5.5 by sodium hydroxide. Urea #1 is added and the pH is adjusted to 5.9±0.1. Heat to reflux for 30 minutes, cool and remove approximately 2.48 liters of distillate under partial vacuum at 65°-85° C. Readjust pH of the mass to 5.9. Heat to 90°±2° C.; allow to hold for V-W Gardner viscosity. Cool the flask by an ice batch to 50° C. Add melamine and then urea #2 both under agitation. When complete solution occurs, increase the pH to 7.4±0.1 for stabilization. Store in refrigerator prior to use. This prepolymer solution has ~0.74 molar ratio of urea and formaldehyde. The small amount of melamine is not a required ingredient in the above formulation but is desirable. Also ~0.59 molar urea-formaldehyde prepolymer has been made.

In a similar manner melamine-formaldehyde prepolymer (molar ratio ~0.62) has been made. Using acid catalyzed polymerization porous structures similar to those produced by the process of this invention have been produced using these urea-formaldehyde or melamine-formaldehyde prepolymers singly or together.

The molar ratio of urea and melamine to formaldehyde in the prepolymers is preferably in the range of about 0.5 to 0.9 for use in the process of this invention although prepolymer having ratios outside this range will be operable to form porous structures and powders in the process of this invention.

As has already been stated herein, an aqueous solution of a urea/formaldehyde prepolymer with molar ratio of 0.74 can be converted into a porous structure by phosphoric acid. Urea/formaldehyde prepolymers are built by condensation polymerization. Urea is reacted with formaldehyde resulting in formation of dimethylol urea and related compounds. These compounds, highly water soluble, can be reacted at will, with elimination of water and/or formaldehyde, to produce medium-sized molecules. This intermediate product(s) together with the later added urea is the urea/formaldehyde prepolymer, and is utilized in the preparation of the porous structure by acidification. Acidification of the medium-sized molecules and later added urea results in their molecular weight promotion, via a series of reactions. These molecular weight promotions lead to insolubility and eventual porous structure formation.

The prepolymer solution is converted into porous structure at an operating solid of approximately 25%. Generally, 7.0% phosphoric acid, based on resin solid is used to make the structure. The formed structure is washed with water to remove phosphoric acid; this is tedious and time consuming. It has now been found that electrosynthesis to form the porous structure is possible and this alleviates the phosphoric acid removal problem.

The setup for electrosynthesis is shown in FIG. 1. AC is converted to DC by a rectifier. The electropolymerization cell is a 1500 ml beaker. Two 3"×5" stainless steel electrodes, 3" apart, are used. The electrode holder is versatile and smaller or larger electodes can be fitted. The electrode materials can be changed to zinc or tin. Copper is not favored because of its discoloration on anodic dissolution.

Both anodic and cathodic reactions can be utilized to convert urea resin into the porous structure. Reactions at the anode, even in simple solutions, are generally more complex than those at the cathode.

The bath composition and constants are given below:

| | | |
|---|---|---|
| Urea/Formaldehyde prepolymer solution (74% solid) | 100.0 | g |
| Deionized water | 300.0 | g |
| 0.5N sulfuric acid | 1.5 | ml |
| Percent prepolymer solid in bath | 18.5 | |
| pH of the bath | 4.5 | |

| Electrosynthesis conditions are as follows: | | | |
|---|---|---|---|
| Polymerization voltage | = | 100 | V |
| Polymerization current | = | 0.4 | A |
| Time voltage applied to bath | = | 60 | seconds |
| Electrode area | = | 4.5 | sq. in |
| Current density | = | 88.9 | mA/sq. in. |

The locus of polymerization is the anode. The structure is formed on the anode, grows around it and continues after cessation of current.

Figure 3:
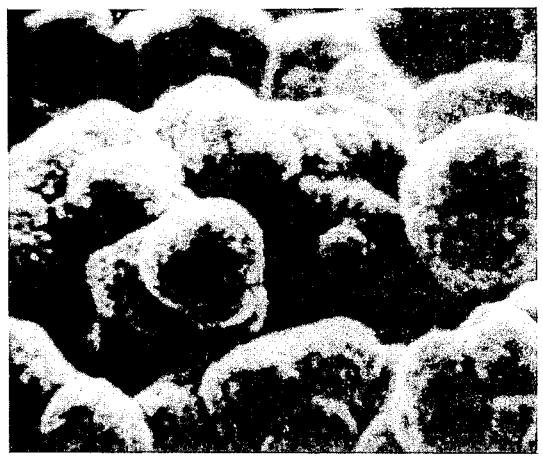
FIG. 3 is a scanning electron microscope photograph of a powdered portion of a porous structure made by the process of the invention from urea-formaldehyde prepolymer such as is described in more detail hereinbelow.

After the porous structure is formed, the anode is removed from the electrolysis cell and the porous structure is separated such as by cutting it from the anode. The separated porous structure can then be reduced suitably by grinding to wet powder form, the powder washed with deionized water to remove soluble contaminants and the washed powder dried. It was from a sample of such dried powder that the photomicrograph of FIG. 3 was made.

A batch process of making the porous structure has been described in detail above; however, the process is operable in a continuous or semi-continuous manner. For example, makeup prepolymer solution can be added continuously or semicontinuously to the electrolysis bath together with other ingredients as needed. After the structure has built up on the anode sufficiently, the anode with the structure thereon can be removed from the bath for recovery of product and a new anode substituted. It will then be necessary to initiate the structure formation on the new anode by a short period of electrolysis as described above, and this procedure can be repeated indefinitely allowing for periodic shutdown to clean equipment.

Alternatively, where production of powder directly is desired, agitation as by a stirrer is provided in the electrolysis vessel together with continuous or semicontinuous makeup of prepolymer and other bath components as needed. Agitation would be sufficiently vigorous continuously or semicontinuously to dislodge primary spherical particles and porous structure from the anode, and the powder then separated from the bath by filtration, centrifuging or equivalent means with recycling of the filtrate to the bath. Continuous agitation would have some affect on the particle size and shape of the product formed.

Rather than using agitation, the porous structure can also be periodically cut from the anode in the bath and the porous structure separated from the bath by filtration or equivalent treatment. It might or might not be necessary to have a short period of electrolysis after cutting the structure from the anode in the bath, to cause the structure to continue to be formed on the anode.

It is also probable that the porous structure can be plasticized by the process of the invention when plasticizers such as polyethylene oxide/propylene oxide block copolymers (Pluronics ®) are added to the electrolysis bath, and these will normally be added at levels of about 10% by weight based on prepolymer solids. Other additives such as dyes, pigments and fillers can be added, if desired, provided they are conductive under electrolysis conditions for forming the porous structure and are attracted to the same electrode.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. For example, apart from urea and melamine or in conjunction therewith, other compounds which are capable of forming polycondensation resins with formaldehyde, can also be allowed to participate in the polycondensation reaction—either in the precondensation stage or in the structure formation stage. Possible compounds of this nature are all compounds which form amino plastics such as thiourea, dicyandiamide, benzoguanamine and aniline. Formaldehyde can also be in part and possibly entirely be replaced by other aldehydes such as acetaldehyde, acrolein, crotonaldehyde, benzaldehyde, glyoxal and furfural. Accordingly, modifications are contemplated which can be made without departing from the spirit of the described invention.

What is claimed is:

1. A process for making porous urea/formaldehyde structures comprising solid approximately-spherical crosslinked particles of less than 10 microns, said process comprising electrolyzing an aqueous solution of urea-formaldehyde prepolymer, the molar ratio of urea and formaldehyde in the prepolymer being about 0.74, the pH of the solution being electrolyzed being about 4.5, the percent urea and formaldehyde pre-polymer in solution being about 18.5 percent prior to electrolysis, and the current density being about 90 milliamperes per square inch of anode surface available for structure formation.

* * * * *